US007310304B2

(12) United States Patent
Mody et al.

(10) Patent No.: US 7,310,304 B2
(45) Date of Patent: Dec. 18, 2007

(54) ESTIMATING CHANNEL PARAMETERS IN MULTI-INPUT, MULTI-OUTPUT (MIMO) SYSTEMS

(75) Inventors: Apurva N. Mody, Atlanta, GA (US); Gordon L. Stuber, Atlanta, GA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 744 days.

(21) Appl. No.: 10/128,756

(22) Filed: Apr. 24, 2002

(65) Prior Publication Data

US 2002/0181390 A1    Dec. 5, 2002

Related U.S. Application Data

(60) Provisional application No. 60/286,130, filed on Apr. 24, 2001, provisional application No. 60/286,180, filed on Apr. 24, 2001.

(51) Int. Cl.
*H04J 11/00* (2006.01)
(52) U.S. Cl. .................. 370/208; 370/206; 370/281
(58) Field of Classification Search ........ 370/204–210, 370/503, 342, 335, 479, 404, 480, 488, 328, 370/329, 330, 428, 281; 375/267, 135, 144–150, 375/285, 130, 140, 142, 346, 348, 350, 343, 375/354, 355, 316, 219, 222, 283, 299, 362, 375/366, 229, 231, 232, 279, 308, 329, 260, 375/261, 295, 298, 349, 340, 347, 358, 210
See application file for complete search history.

(56) References Cited

U.S. PATENT DOCUMENTS

| 5,732,113 | A |   | 3/1998 | Schmidl et al. ............. 375/355 |
| 5,867,478 | A | * | 2/1999 | Baum et al. ................. 370/203 |
| 6,029,058 | A | * | 2/2000 | Namgoong et al. ......... 455/324 |
| 6,058,105 | A | * | 5/2000 | Hochwald et al. .......... 370/310 |
| 6,088,408 | A |   | 7/2000 | Calderbank et al. ........ 375/347 |
| 6,115,427 | A |   | 9/2000 | Calderbank et al. ........ 375/267 |
| 6,125,149 | A |   | 9/2000 | Jafarkhani et al. .......... 375/262 |
| 6,148,024 | A | * | 11/2000 | Ho et al. ..................... 375/222 |
| 6,185,258 | B1 |  | 2/2001 | Alamouti et al. ............ 375/260 |
| 6,188,736 | B1 |  | 2/2001 | Lo et al. ...................... 375/347 |
| 6,373,861 | B1 | * | 4/2002 | Lee ............................. 370/503 |
| 6,473,467 | B1 | * | 10/2002 | Wallace et al. .............. 375/267 |
| 6,771,706 | B2 | * | 8/2004 | Ling et al. ................... 375/267 |
| 6,792,035 | B2 | * | 9/2004 | Kontola ....................... 375/148 |

(Continued)

OTHER PUBLICATIONS

Mody, Apurva N. and Stuber, Gordon L., "Synchronization for MIMO OFDM Systems," School of Electrical and Computer Engineering, Georgia Institute of Technology, Atlanta, GA.

(Continued)

*Primary Examiner*—Wing Chan
*Assistant Examiner*—Mark A. Mais
(74) *Attorney, Agent, or Firm*—Thomas, Kayden, Horstemeyer & Risley; Daniel J. Long (57) ABSTRACT

In a communication system, and in particular a wireless Orthogonal Frequency Division Multiplexing (OFDM) communication system, the present invention provides systems for estimating parameters of a channel across which a signal is transmitted. The present invention may be used in a Multi-Input, Multi-Output (MIMO) system in which the data is transmitted from any number of transmitting antennas and received by any number of receiving antennas. The number of transmitting and receiving antennas does not necessarily have to be the same. Circuitry is provided for calculating parameters indicative of the characteristics of the communication channel. Estimates of channel parameters may include channel estimates and noise variance estimates.

22 Claims, 8 Drawing Sheets

U.S. PATENT DOCUMENTS

| | | | |
|---|---|---|---|
| 6,850,481 B2 * | 2/2005 | Wu et al. | 370/208 |
| 6,888,899 B2 * | 5/2005 | Raleigh et al. | 375/299 |
| 6,952,454 B1 * | 10/2005 | Jalali et al. | 375/260 |
| 6,961,388 B2 * | 11/2005 | Ling et al. | 375/267 |
| 6,985,434 B2 * | 1/2006 | Wu et al. | 370/208 |
| 6,996,195 B2 * | 2/2006 | Kadous | 375/341 |
| 7,010,029 B1 * | 3/2006 | Naguib et al. | 375/229 |
| 7,110,350 B2 * | 9/2006 | Li et al. | 370/204 |
| 7,133,459 B2 * | 11/2006 | Onggosanusi et al. | 375/267 |
| 7,139,321 B2 * | 11/2006 | Giannakis et al. | 375/260 |
| 2002/0041635 A1 * | 4/2002 | Ma et al. | 375/267 |
| 2002/0122381 A1 * | 9/2002 | Wu et al. | 370/208 |
| 2002/0154705 A1 * | 10/2002 | Walton et al. | 375/267 |
| 2002/0191703 A1 * | 12/2002 | Ling et al. | 375/267 |
| 2003/0043928 A1 * | 3/2003 | Ling et al. | 375/267 |
| 2006/0227904 A1 * | 10/2006 | Mueller-Weinfurtner et al. | 375/343 |

OTHER PUBLICATIONS

Mody, Apurva N. and Stuber, Gordon L., "Parameter Estimation for MIMO OFDM Systems," School of Electrical and Computer Engineering, Georgia Institute of Technology, Atlanta, GA.

Schmidle, Timothy M. and Cox, Donald C., "Robust Frequency and Timing Synchronization for OFDM," IEEE Transactions on Communications, vol. 45, No. 12, Dec. 1997, pp. 1613-1621.

Alamouti, Siavash M., "A Simple Transmit Diversity Technique for Wireless Communications," IEEE Journal on Select Areas in Communications, vol. 16, No. 8, Oct. 1998.

Li, Ye (Geoffrey), Seshadri, Nambirajan, and Ariyavisitakul, Sirikiat, "Channel Estimation for OFDM Systems with Transmitter Diversity in Mobile Wireless Channels," IEEE Journal on Selected Areas in Communications, vol. 17, No. 3, Mar. 1999.

Tarokh, Vahid, Jafarkhani, Hamid, and Calderbank, A. Robert, "Space-Time Block Coding for Wireless Communications: Performance Results," IEEE Journal on Selected Areas in Communications, vol. 17, No. 3, Mar. 1999.

Mody, Apurva N. and Stuber, Gordon L., "Efficient Training and Synchronization Sequence Structures for MIMO OFDM," School of Electrical and Computer Engineering, Georgia Institute of Technology, Atlanta, GA 30332 and Wi-LAN, Wireless Data Communications Inc., Atlanta, Georgia, pp. 1-7.

Tarokh, Vahhid, Jafarkhani Hamid, and Calderbank, A.R., "Space-Time Block Codes from Orthogonal Designs," IEEE Transactions on Information Theory, vol. 45, No. 5, Jul. 1999.

* cited by examiner

ESTIMATING CHANNEL PARAMETERS IN MULTI-INPUT, MULTI-OUTPUT (MIMO) SYSTEMS

CROSS-REFERENCE TO RELATED APPLICATIONS

This application claims priority to copending U.S. provisional application entitled "Parameter Estimation for MIMO OFDM Systems," having Ser. No. 60/286,130, filed on Apr. 24, 2001, which is entirely incorporated herein by reference.

This application is related to copending U.S. provisional application entitled, "Synchronization for MIMO OFDM Systems," having Ser. No. 60/286,180, filed Apr. 24, 2001, which is entirely incorporated herein by reference.

TECHNICAL FIELD OF THE INVENTION

The present invention is generally related to wireless communication systems that employ Orthogonal Frequency Division Multiplexing (OFDM). More particularly, the present invention is related to an apparatus and method for estimating channel parameters in a Multi-Input, Multi-Output (MIMO) OFDM system.

BACKGROUND OF THE INVENTION

In wireless communication systems, recent developments have been made using technologies wherein multiple signals are simultaneously transmitted over a single transmission path. In Frequency Division Multiplexing (FDM), the frequency spectrum is divided into sub-channels. Information (e.g. voice, video, audio, text, etc.) is modulated and transmitted over these sub-channels at different sub-carrier frequencies.

In Orthogonal Frequency Division Multiplexing (OFDM) schemes, the sub-carrier frequencies are spaced apart by precise frequency differences. Because of the ability of OFDM systems to overcome the multiple path effects of the channel, and to transmit and receive large amounts of information, much research has been performed to advance this technology. By using multiple transmitting antennas and multiple receiving antennas in OFDM systems, it is possible to increase the capacity of transmitted and received data while generally using the same amount of bandwidth as in a system with one transmit and one receive antenna.

OFDM technologies are typically divided into two categories. The first category is the Single-Input, Single-Output (SISO) scheme, which utilizes a single transmitting antenna to transmit radio frequency (RF) signals and a single receiving antenna to receive the RF signals. The second category is the Multi-Input, Multi-Output (MIMO) scheme, which uses multiple transmitting antennas and multiple receiving antennas.

In typical communication systems, training symbols, or preambles, at the beginning of data frames, are usually added as a prefix to the data symbols. The data symbols, of course, include the useful data or information (e.g., voice, data, video, etc.), which is meant to be transmitted to a remote location. The training symbols in SISO systems are used to provide synchronization of the received signals with respect to the transmitted signals, as well as to provide channel parameter estimation.

Although training symbols used for SISO systems can be used to provide synchronization in a MIMO system, the training symbols cannot provide for channel parameter estimation in the MIMO system. In fact, no method or apparatus exists for MIMO systems that is capable of providing time and frequency synchronization as well as channel parameter estimation. Thus, a need exists for a method and apparatus that is capable of providing time and frequency synchronization in MIMO systems and can further perform channel estimation.

SUMMARY OF THE INVENTION

The present invention provides systems and methods that overcome the deficiencies of the prior art as mentioned above. The present invention utilizes a sequence of training symbols or preambles that may be used in both Single-Input, Single-Output (SISO) and Multi-Input, Multi-Output (MIMO) systems, using any number of transmitting and receiving antennas. An embodiment of the present invention comprises an apparatus that can be used to estimate channel parameters across which a data frame is transmitted in a MIMO system. In conjunction with a synchronization scheme, the parameter estimator calculates an accurate estimation of the characteristics of the channel, thereby making the MIMO systems operational. The present invention achieves an accurate estimation of channel parameters and further achieves synchronization in the time domain and frequency domain and, therefore, enables MIMO systems to operate acceptably.

One MIMO Orthogonal Frequency Division Multiplexing (OFDM) system of the present invention includes a number of OFDM modulators, which provide data frames to be transmitted across a channel. The data frames of the present invention comprise one or more training symbols, a plurality of data symbols, and cyclic prefixes inserted between the data symbols. A number of transmitting antennas corresponding to the number of modulators are used to transmit the modulated signals over the channel. A number of receiving antennas are used to receive the transmitted signals. The received signals are demodulated by a number of OFDM demodulators corresponding to the number of receiving antennas and decoded by an OFDM decoder, which processes the data frames. By utilizing the structure embedded in the training symbols, the MIMO system of the present invention is capable of providing time and frequency synchronization as well as perform channel estimation.

A method of the present invention is also provided, wherein parameter estimation is carried out in a MIMO system. The method includes producing data frames comprising at least one training symbol, multiple data symbols and cyclic prefixes. The data frames are transmitted over the channel, received, demodulated, and processed. By processing the training symbol of the data frame, an estimation of the parameters of the channel may be achieved from the data frame.

Other systems, methods, features, and advantages of the present invention will become apparent to a person having skill in the art upon examination of the following drawings and detailed description. All such additional systems, methods, features, and advantages are within the scope of the present invention.

BRIEF DESCRIPTION OF THE DRAWINGS

Many aspects of the invention can be better understood with reference to the following drawings. Moreover, in the drawings, like reference numerals designate corresponding parts throughout the several views.

DETAILED DESCRIPTION OF THE PREFERRED EMBODIMENT

Figure 1:
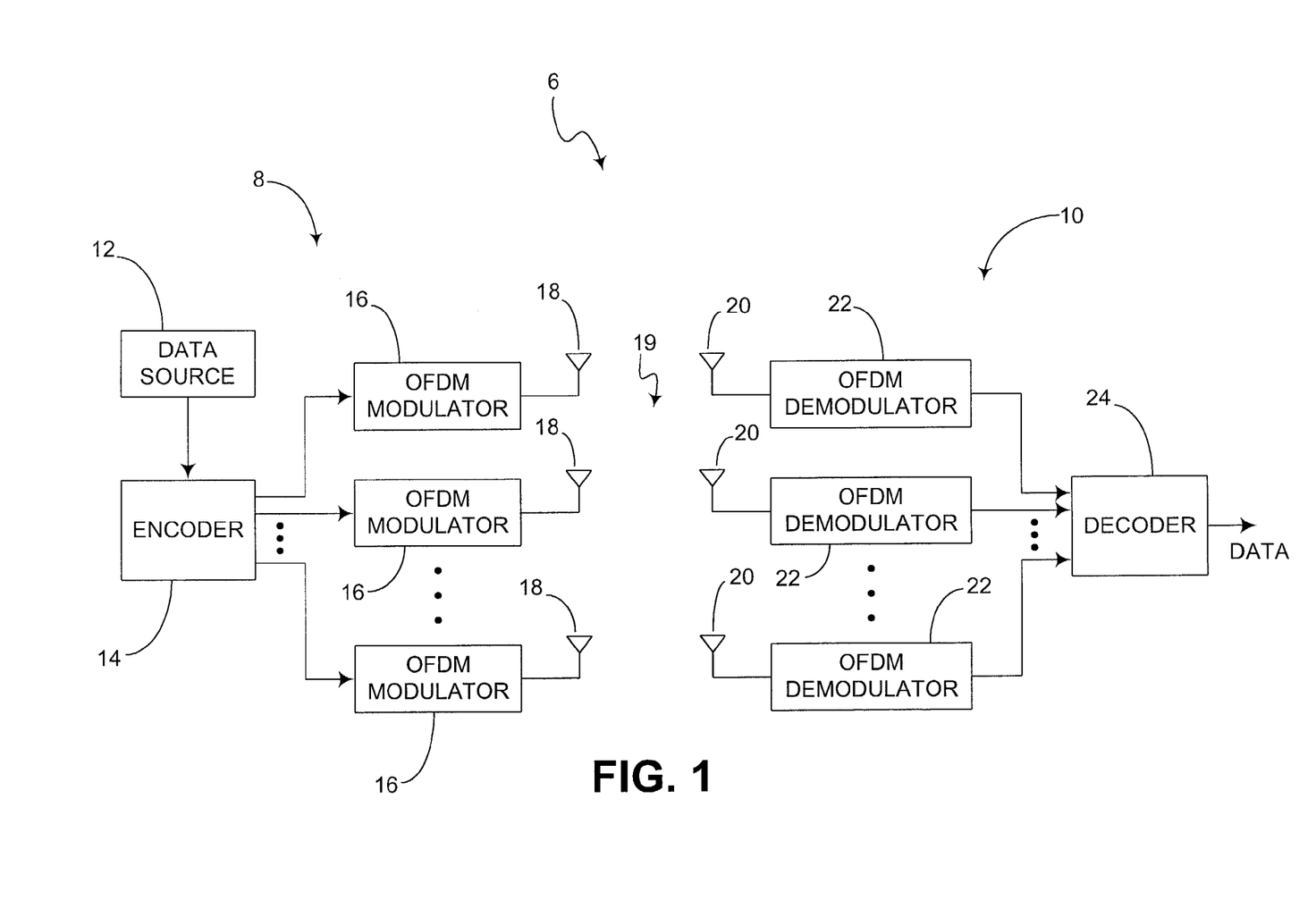
FIG. 1 is a block diagram illustrating an example embodiment of a Multi-Input, Multi-Output (MIMO) Orthogonal Frequency Division Multiplexing (OFDM) system.

In FIG. 1, an example embodiment of a Multi-Input, Multi-Output (MIMO) Orthogonal Frequency Division Multiplexing (OFDM) communication system 6 of the present invention is shown. The communication system 6 in this example embodiment may be implemented as a wireless system for the transmission and reception of data across a wireless channel 19. The communication system 6, for example, may be part of a wireless Local Area Network (LAN) system or wireless Metropolitan Area Network (MAN) system, cellular telephone system, or other type of radio or microwave frequency system incorporating either one-way or two-way communication over a range of distances. The communication system 6 may transmit in a range from 2 to 11 GHz, for example, such as in the unlicensed 5.8 GHz band using a bandwidth of about 3-6 MHz.

It is also possible for the present invention to be used in a system that comprises an array of sub-channel communication links that carry a number of signals transmitted by a number of transmitting elements to each of a number of receiving elements. In this latter case, communication links, such as wires in a wiring harness or some alternative wired transmission system, for example, could be used over the distance between a data source and a receiver.

In the example embodiment of FIG. 1, a transmitter 8 transmits signals across the wireless channel 19 and a receiver 10 receives the transmitted signals. The transmitter 8 comprises a data source 12, which provides the original binary data to be transmitted from the transmitter 8. The data source 12 may provide any type of data, such as, for example, voice, video, audio, text, etc. The data source 12 applies the data to an encoder 14, which encodes the data to allow for error correction. The encoder 14 further processes the data so that certain criterion for space-time processing and OFDM are satisfied. The encoder 14 separates the data onto multiple paths in the transmitter 8, each of which will hereinafter be referred to as a transmit diversity branch (TDB). The separate TDBs are input into OFDM modulators 16, each of which modulates the signal on the respective TDB for transmission by the transmitting antennas 18. The present invention may be used in a Single-Input, Single-Output (SISO) system, which may be considered as a special case of MIMO wherein the number of transmitting and receiving antennas is one. In the SISO system example, separation of the data by the encoder 14 is not necessary since only one OFDM modulator 16 and antenna 18 is used.

During the encoding by the encoder 14 and modulating by the OFDM modulators 16, data is normally bundled into groups such that the collection of each group of data is referred to as a "frame." Details of the frame as used in the present invention will be described in more detail below with reference to FIG. 4. Each frame along each TDB is output from a respective OFDM modulator 16. As illustrated in FIG. 1, any number of OFDM modulators 16 may be used. The number of OFDM modulators 16 and respective transmitting antennas 18 may be represented by a variable "Q." The OFDM modulators 16 modulate the respective frames at specific sub-carrier frequencies and respective transmitting antennas 18 transmit the modulated frames over the channel 19.

On the side of the receiver 10, a number "L" of receiving antennas 20 receives the transmitted signals, which are demodulated by a number L of respective OFDM demodulators 22. The number L may represent any number and is not necessarily the same as the number Q. In other words, the number Q of transmitting antennas 18 may be different from the number L of receiving antennas 20, or they may alternatively be the same. The outputs of the demodulators 22 are input into a decoder 24, which combines and decodes the demodulated signals. The decoder 24 outputs the original data, which may be received by a device (not shown) that uses the data.

The communication system 6 may comprise one or more processors, configured as hardware devices for executing software, particularly software stored in computer-readable memory. The processor can be any custom made or commercially available processor, a central processing unit (CPU), an auxiliary processor among several processors associated with a computer, a semiconductor based microprocessor (in the form of a microchip or chip set), a microprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, a 68xxx series microprocessor from Motorola Corporation, or a 67xxx series Digital Signal Processor from the Texas Instruments Corporation.

When the communication system 6 is implemented in software, it should be noted that the communication system 6 can be stored on any computer-readable medium for use by or in connection with any computer-related system or method. In the context of this document, a computer-readable medium is an electronic, magnetic, optical, or other physical device or means that can contain or store a computer program for use by or in connection with a computer related system or method. The communication system 6 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. Examples of the computer-readable medium include the following: an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the communication system 6 is implemented in hardware, the communication system can be implemented with any or a combination of the following technologies, which are each well known in the art: one or more discrete logic circuits having logic gates for implementing logic functions upon data signals, an application specific integrated circuit (ASIC) having an appropriate combination of logic gates, a programmable gate array (PGA), a field programmable gate array (FPGA), etc.

Figure 2:
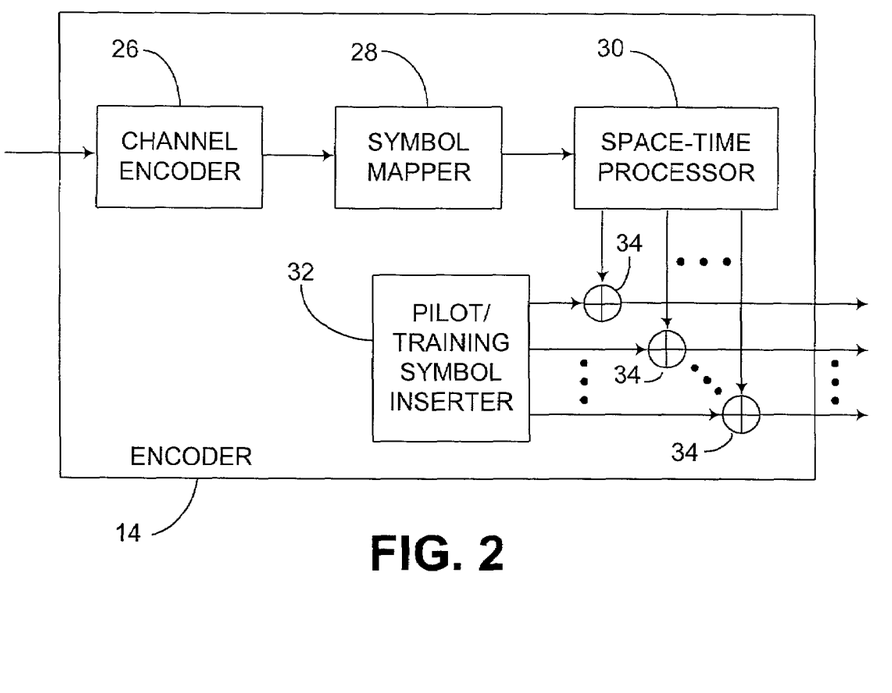
FIG. 2 is a block diagram illustrating an example embodiment of the MIMO encoder shown in FIG. 1.

The encoder 14 and OFDM modulators 16 of the transmitter 8 will now be described with respect to FIGS. 2 and 3. FIG. 2 shows details of an example embodiment of the encoder 14 shown in FIG. 1. The encoder 14 may be configured such that data from the data source 12 is encoded by a channel encoder 26, which adds parity to the original data to produce channel encoded data. The channel encoder 26 encodes the data using a scheme that is recognized by the decoder 24 of the receiver 10 and enables the decoder 24 to detect errors in the received data. Errors may arise as a result of environmental conditions of the channel 19 or noise inadvertently added by the transmitter 8 or receiver 10.

The encoder 14 further includes a symbol mapper 28, which maps the channel-encoded data into data symbols. The symbol mapper 28 groups a predetermined number of bits such that each group of bits constitutes a specific symbol chosen from a pre-determined alphabet. The symbol mapper 28 further lays out a stream of data symbols within the structure of a frame.

The encoder 14 further includes a space-time processor 30 that processes the data symbol stream received from the symbol mapper 28 and outputs the processed data symbols via the respective TDBs. The space-time processor 30 encodes the data symbol stream in a manner such that the receiver 10 is capable of decoding the signals. The data symbols in the TDBs are distributed over Q lines that will eventually be transmitted at precise frequencies spaced apart from each other by a predetermined difference in frequency. By providing a specific frequency difference between the multiple sub-channels, orthogonality can be maintained, thereby preventing the OFDM demodulators 22 from picking up frequencies other than their own designated frequency.

Each TDB provides an input to a respective adder 34. The other input into each of the adders 34 is connected to the output of a pilot/training symbol inserter 32, which provides pilot symbols and training symbols to be inserted into the frames on the TDBs. Symbols inserted periodically within the data symbols will be referred to herein as "pilot symbols." These periodic pilot symbols may be inserted anywhere in the stream of the data symbols. If a continuous burst of symbols is inserted by the pilot/training symbol inserter 32, this type of symbol will be referred to herein as "training symbols" which constitute the preamble. The training symbols preferably are inserted at the beginning of the frame. However, the training symbols may be inserted onto the frame in a location other than at the beginning of the frame, such as at the end or in the middle of the frame.

The pilot/training symbol inserter 32 may be configured so that it is capable of storing multiple sets of training symbols or pilot symbols. In this case, a particular set may be selected, for example, based on desirable communication criteria established by a user. The training symbols for each respective sub-channel may preferably be unique to the particular sub-channel. In order to accommodate amplitude differences between the sub-channels, the training symbols may be designed and adjusted to maintain a constant amplitude at the output of each sub-channel.

Training symbols are preferably transmitted once for every frame. Training symbols are used for periodic calibration (synchronization and channel parameter estimation) whereas pilot symbols are used for minor adjustments to deal with the time-varying nature of the channel. The training symbols may be indicative of calibration values or known data values. These calibration values or known values may be transmitted across the channel, and used to calibrate the communication system 6. Any necessary refinements may be made to the communication system 6 if the received calibration values do not meet desirable specifications.

Furthermore, the training symbols may be used as specific types of calibration values for calibrating particular channel parameters. By initially estimating these channel parameters, offsets in the time domain and frequency domain may be accounted for so as to calibrate the communication system 6. The training sequence may or may not bypass an Inverse Discrete Fourier Transform (IDFT) stage 38, which is a part of the embodiment of the OFDM modulator 16 of FIG. 3. A training sequence that bypasses the IDET stage 38 and is directly input into a digital to analog converter (DAC) 44 is referred to herein as a directly modulatable training sequence. Examples of such training sequences may be "chirp-like" sequences. These sequences cover each portion of the bandwidth used by the communication system 6. Hence, channel response can be easily determined. In general, a chirp sequence in the time domain is given by the equation:

$$s_n = \cos\left(\frac{\pi n^2}{N}\right) + j\sin\left(\frac{\pi n^2}{N}\right), n = 0, 1, K, N-1,$$

where j is given by $\sqrt{-1}$ and is used to denote the quadrature component of the signal. It should be noted that the term $s_n$ refers to a time domain signal on the side of the transmitter 8. Frequency domain signals on the transmitter side will hereinafter be referenced by capital letters $S_k$. Time and frequency domain signals on the receiver side will hereinafter be written as $r_n$ and $R_k$, respectively. The space-time or the space-frequency training structure may be formed using chirp or chirp-like sequences. Some of the modifications of the chirp-like sequence may be Frank-Zadoff sequences, Chu sequences, Milewski sequences, Suehiro polyphase sequences, and sequences given by Ng et al. By observing the response of the receiver 10 to the chirp signals, the channel parameters may be estimated.

In the case when the IDFT stage 38 is not bypassed, a training sequence may be generated by modulating each of the symbols on the TDBs with a known sequence of symbols in the frequency domain and passing the symbols through the IDFT stage 38. Generally, such a known sequence of symbols is obtained from an alphabet which has its constituents on the unit circle in the complex domain and such that the resultant sequence in the time domain has a suitable Peak to Average Power Ratio (PAPR). The term "alphabet" in communication systems is defined as a finite set of complex values that each of the symbols can assume. For example, an alphabet of a binary phase shift keying (BPSK) system consists of values +1 and −1 only. An alphabet for a quaternary phase shift keying (QPSK) system consists of the values 1+j, −1+j, 1−j, and −1−j. For example, the training sequence may be generated by modulating each of the tones of the OFDM block using a BPSK alphabet, which consists of symbols +1 and −1. The synchronization scheme may be very general such that any known sequence having suitable properties, such as low PAPR, may be used to form the training sequence.

With reference again to FIG. 2, the adders 34 add the training symbols and pilot symbols to the frame. Other embodiments may be used in place of the adders 34 for combining the training symbols and pilot symbols with the data symbols in the frame. Furthermore, the adders 34 may include additional inputs to allow for flexibility when adding the pilot/training symbols or in the combining of multiple training symbols or even selectable training symbols. After the training symbols are inserted into frames on the respective TDBs, the frames are output from the encoder 14 and input in respective OFDM modulators 16.

Figure 3:
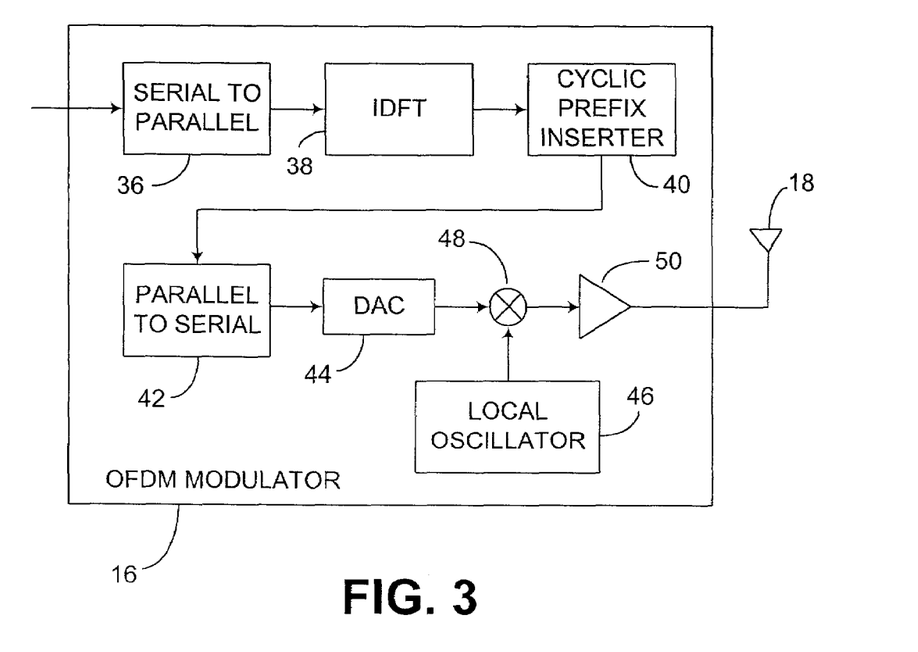
FIG. 3 is a block diagram illustrating an example embodiment of one of the OFDM modulators shown in FIG. 1.

FIG. 3 shows an example embodiment of an OFDM modulator 16, which receives signals along one of the TDBs. The number of OFDM modulators 16 is preferably equal to the number of transmitting antennas 18. In SISO systems, there is only one OFDM modulator 16 and one transmitting antenna 18. In MIMO systems, there may be any number of OFDM modulators 16 and transmitting antennas 18.

The respective signal from the encoder 14 is input into a serial-to-parallel converter 36 of the OFDM modulator 16. The serial-to-parallel converter 36 takes N symbols received in a serial format and converts them into a parallel format. The variable N will be referred to herein as the blocksize of the OFDM symbol. The N parallel symbols are processed by an Inverse Discrete Fourier Transform (IDFT) stage 38, which transforms the frequency signals to the time domain. The N number of transformed symbols in the time domain will be referred to herein as samples.

A method is proposed herein to design the training symbols such that the transforms of all the sequences from the IDFT stage 38 will have a constant magnitude. By maintaining a constant magnitude at the output of each of the IDFT stages 38 within their respective modulators, one of the main problems of OFDM, i.e., peak to average power ratio (PAPR), is solved. The receiver 10 can thus more accurately estimate the channel parameters, which are used by the receiver 10 to synchronize the received signals in the time and frequency domains, as will be described below in more detail.

The output from the IDFT stage 38 is input into a cyclic prefix inserter 40, which inserts an additional number of samples for every N samples. The number of samples inserted by the cyclic prefix inserter 40 will be referred to herein by the variable "G." The G samples are intended to be inserted as guard intervals to separate the N adjacent data symbols from each other in time by a separation adequate to substantially eliminate Inter Symbol Interference (ISI). The cyclic prefix inserter 40 repeats G samples from a latter portion of the N samples output from the IDFT stage 38 and inserts the G samples as a prefix to each of the data samples. Preferably, the time length of the cyclic prefix is greater than the maximum time delay of a transmitted signal across the channel 19. Since the nature of the channel 19 may be susceptible to a variation in the delay time from the transmitted antennas 18 to the receiving antennas 20, it may be desirable to increase, or even double, the length of cyclic prefixes of the preamble to ensure that the time delay of the channel does not exceed the time of the cyclic prefix, thereby eliminating ISI.

The G+N samples, herein referred to as an OFDM symbol, are then converted from a parallel format to a serial format using parallel-to-serial converter 42, and then inputted to a digital-to-analog converter (DAC) 44 for conversion into analog signals. The output from the DAC 44 is input into a mixer 48. A local oscillator 46 provides a signal having the carrier frequency to the other input of the mixer 48 to up-convert the respective OFDM symbol from baseband to RF.

After the respective frame has been mixed with a carrier frequency that is set by the respective local oscillator 46, the frame is amplified by an amplifier 50. As indicated above, one of the drawbacks to any OFDM signal is that it generally has a high PAPR. To accommodate this drawback, the amplifier 50 may be backed off to prevent it from going into its non-linear region. However, the present invention may provide certain specific sequences that can be used in order to make the PAPR minimal or unity.

Each OFDM modulator 16 preferably comprises the same components as the OFDM modulator 16 shown in FIG. 3. Other techniques for designing the OFDM modulators 16 may be used in order to transmit the multiple frames across the channel 19 with minimal interference. Each frame output from the respective OFDM modulator 16 is transmitted by a respective antenna 18. The antennas 18 may be spaced apart from each other by any desirable separation. For example, the separation distance may be in a range from a few millimeters to several meters.

Figure 4:
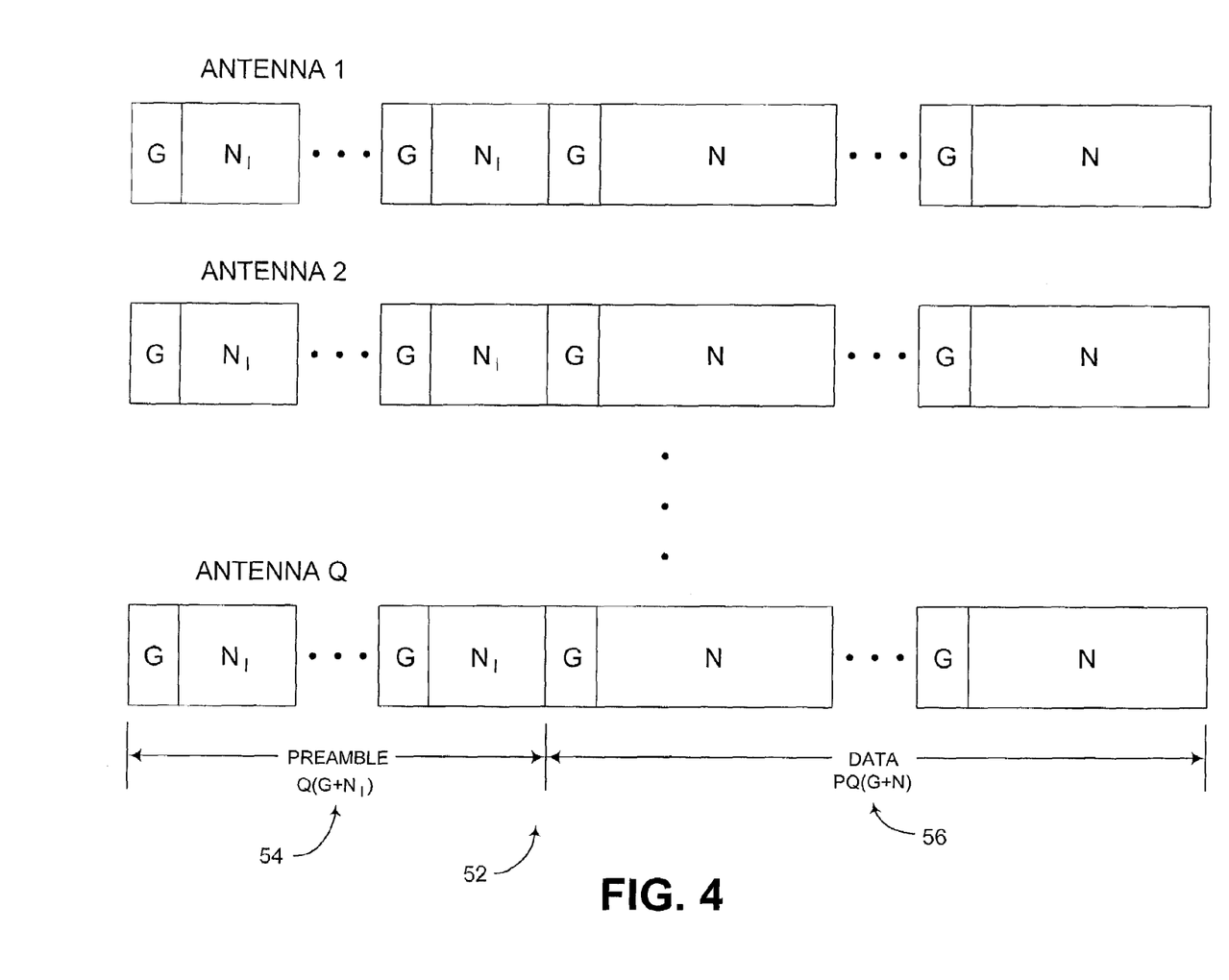
FIG. 4 illustrates an example frame structure for a MIMO OFDM system.

FIG. 4 illustrates an example of a frame 52 that is transmitted across the channel 19 from the transmitting antennas 18 to the receiving antennas 20. The frame 52 comprises a preamble 54 comprising a number of training symbols $N_I$ and cyclic prefixes G. The preamble 54 is inserted by the pilot/training symbol inserter 32 as mentioned above. In addition, the data frame 52 comprises a data portion 56 consisting of a plurality of OFDM data symbols N and cyclic prefixes G, which are inserted before each of the OFDM data symbols N. As previously mentioned, the pilot/training symbol inserter 32 further inserts pilot symbols (not shown) intermittently within the OFDM data symbols N. The task of the preamble 54 and training symbols $N_I$ in the frame is to help the receiver 10 identify the arrival of the frame 52 and hence perform time synchronization, frequency synchronization, and channel parameter estimation.

The preamble 54, in general, consists of Q or more training symbols, wherein each training symbol has a length of $G+N_I$ samples in time. The number of samples $N_I$ is established as a certain fraction of the number of data samples N in an OFDM block such that $N_I=N/I$, where I is an integer, such as 1, 2, 4 . . . For example, $N_I$ may be ¼ N.

If no predetermined $N_f$ has been established, the variable $N_f$ may be given the value equal to N. The training symbol length may be shorter than the length of the symbols in the data portion 56, which has a length of G+N samples.

Figure 5:
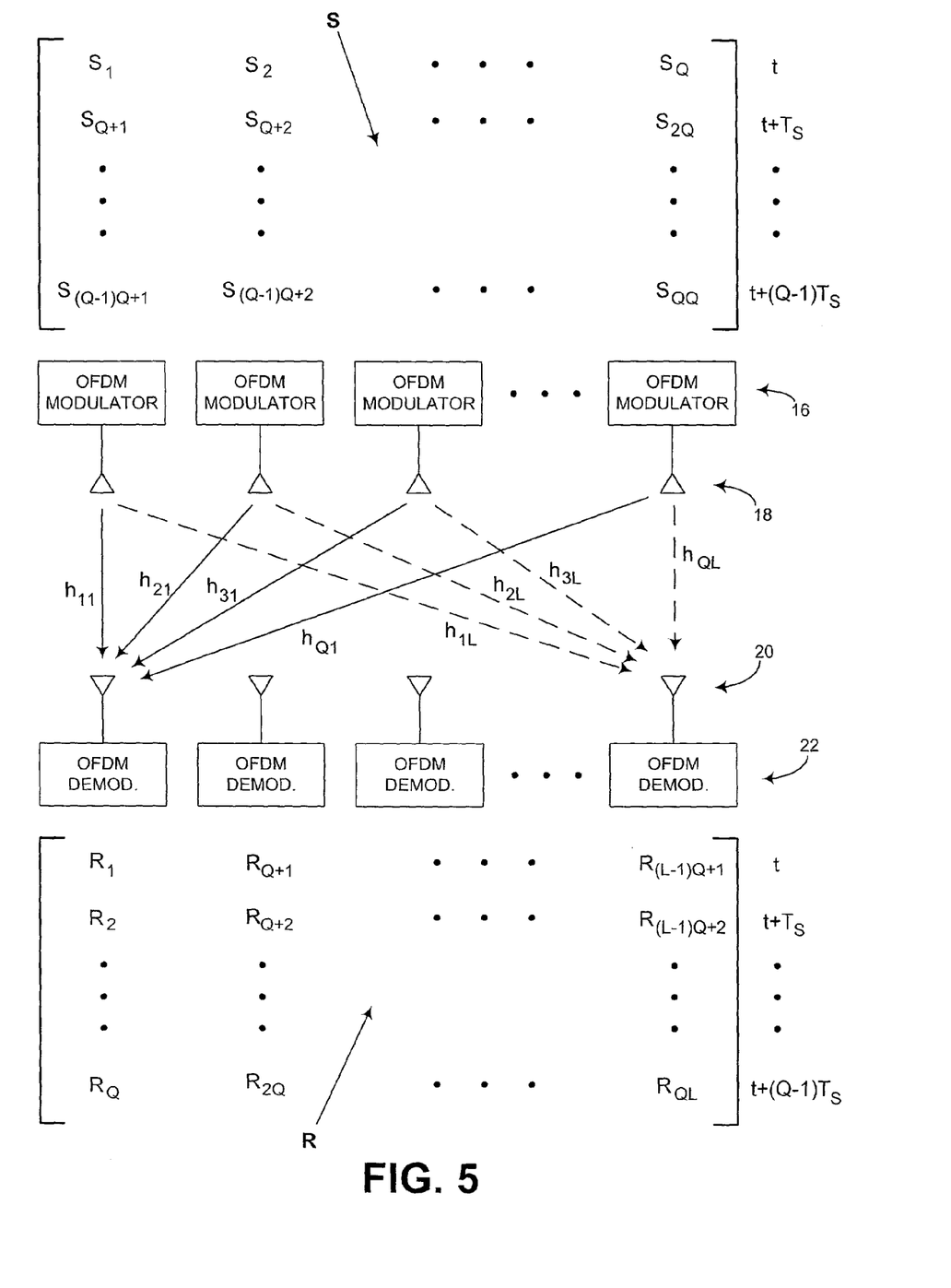
FIG. 5 is a block diagram illustrating an example matrix of a transmitted sequence structure and an example matrix of a received sequence structure using the modulator/demodulator arrangement shown in FIG. 1.

FIG. 5 shows a portion of the MIMO OFDM communication system 6 of FIG. 1 along with details of a signal transmission matrix S and a received demodulated OFDM sample matrix R. The signals of the communication system 6 can be expressed using the equation:

$$R_{k,T \times L} = S_{k,T \times Q} \eta_{k,Q \times L} + W_{k,T \times L}$$

where R is a T×L received demodulated OFDM sample matrix, η is a Q×L matrix of channel coefficients that are indicative of the characteristics of the channel across which the signals are transmitted, S is a T×Q signal transmission matrix, and W is a T×L noise matrix that corrupts and distorts the received sample matrix R. In general, T may or may not be equal to Q. However, for simplicity, T is assumed to be equal to Q herein.

The signal transmission matrix S shown in FIG. 5 consists of Q OFDM symbols that are simultaneously transmitted from Q transmit antennas 18 over Q or more OFDM symbol periods ($T_s$). For example, at a first time instance t, the OFDM symbols $S_1, S_2, \ldots S_Q$ are transmitted from the first to the Qth antennas 18. At a second time instance t+$T_S$, the OFDM symbols $S_{Q+1}, S_{Q+2}, \ldots S_{2Q}$ are transmitted from the same antennas 18. The OFDM symbol transmissions are repeated at each time instance until all of the OFDM symbols of the matrix S have been transmitted.

During the transmission of training symbols in an initial calibration mode, the S matrix consists of Q or more training symbols, each of which is less than or equal to the length of an OFDM symbol in the time dimension. The training symbols are simultaneously transmitted from the transmitting antennas 18 as represented by equations (1) and (2), wherein the different antennas correspond to the space dimension.

During the transmission of the data symbols, after the communication system 6 has been calibrated, the S matrix consists of Q or more data symbols each occupying an OFDM symbol in the time dimension. The pilot/training symbol inserter 32 inserts the pilot symbols within the data symbols. The data symbols are encoded, modulated, and transmitted from the transmitting antennas 18.

Each signal transmission matrix S of Q×Q OFDM symbols are transmitted over the communication channel 19, which naturally comprises a matrix of channel coefficients η. Typically, the communication channel 19 further includes characteristics that distort and degrade the transmitted signal, thereby adding a noise matrix W, before the signal transmission matrix S is received at the L receive antennas 20.

FIG. 5 further illustrates how each of the L receiving antennas 20 receives each of the Q transmitted signals. For example, the first receive antenna 20 receives OFDM signals over channel impulse responses $h_{11}, h_{21}, h_{31} \ldots h_{Q1}$ from the first to the Qth transmitting antennas 18, respectively. The term $h_{i,j}$ refers to the channel impulse response from the $i^{th}$ transmit to the $j^{th}$ receive antenna in the time domain. The last receive antenna 20 receives the transmitted signals over the channel impulse responses $h_{1L}, h_{2L}, h_{3L}, \ldots h_{QL}$ from the first to the Qth transmitting antennas 18, respectively. For simplicity, only the signals received at the first and last receiving antennas 20 are shown. However, it should be understood that each receiving antenna 20 receives the signals transmitted from the Q transmitting antennas 18.

The received signals are demodulated by the respective OFDM demodulators 22, which provide the received demodulated OFDM sample matrix R. At a time instance t, the samples $R_1, R_{Q+1}, \ldots R_{(L-1)Q+1}$ are received. At a next time instance t+Ts, the samples $R_2, R_{Q+2} \ldots R_{(L-1)Q+2}$ are received. The samples are received at each time instance until all of the samples in the received demodulated OFDM sample matrix R are received. It should be noted that the time instances used for the matrices S and R are given the same variable, but, in essence, a delay occurs as is well known in the art.

A significant task of the receiver 10 is to estimate the time of arrival of the transmitted signal. This process is called "time synchronization." In addition to time synchronization, OFDM systems typically require frequency synchronization as well. Because there usually exists a certain difference between the local oscillator frequencies of the transmitter and the receiver, the received signals experience a loss of sub-carrier orthogonality, which should typically be corrected in order to avoid degradation in system performance.

Figure 6:
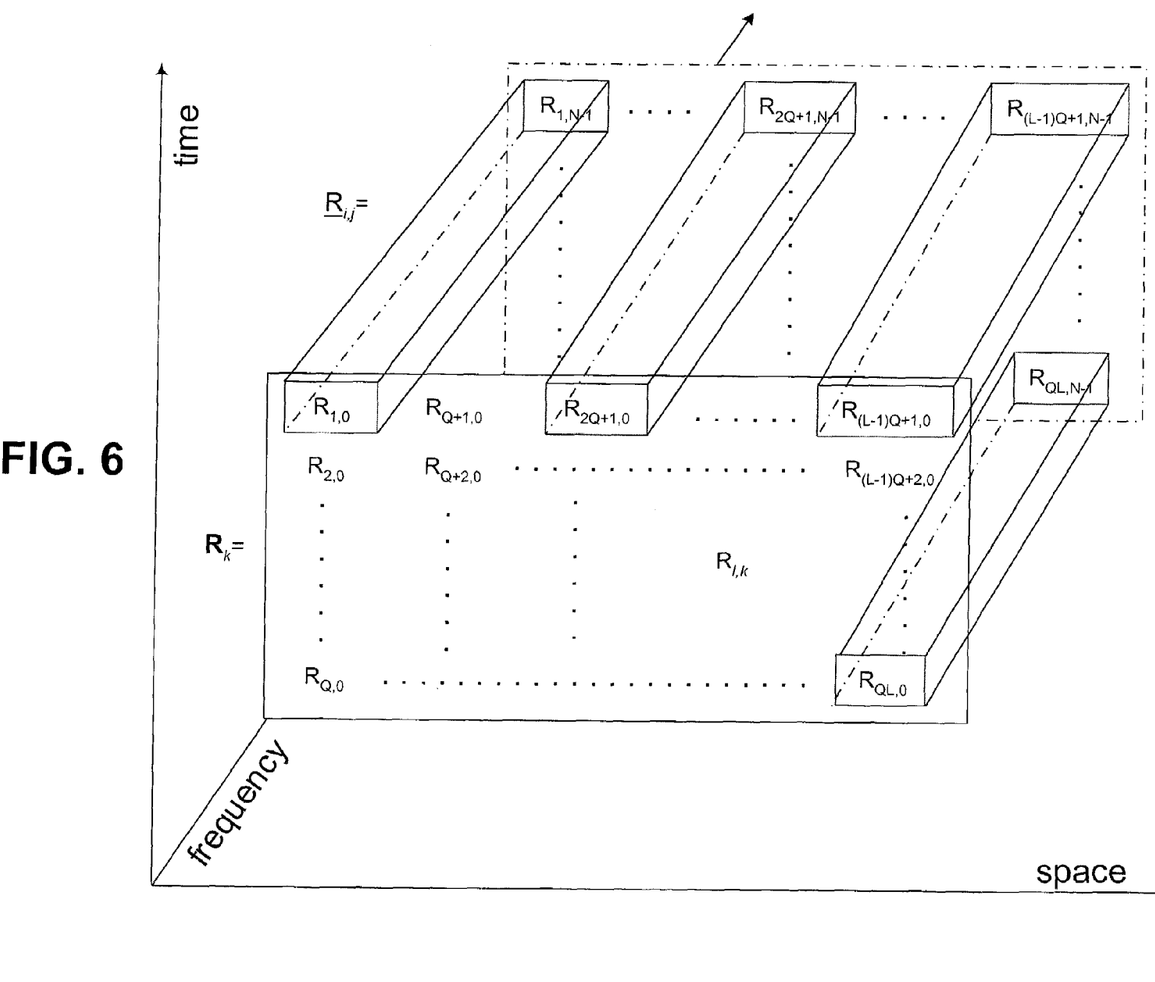
FIG. 6 illustrates a three-dimensional representation of the received sequence structure in detail.

FIG. 6 shows a detailed illustration of the received demodulated OFDM sample matrix R which consists of L columns and Q or more rows of OFDM symbols with respect to space and time, respectively. As shown, the matrix R consists of three dimensions, namely space, time and frequency. The frequency axis indicates the amplitude of the frequency component received at each receiving antenna 20 from each transmitting antenna 18. Each of the matrices R and η can be seen to consist of either N matrices of dimension Q×L or Q×L vectors of length N.

In general, the training symbol length may be equal to the data symbol length. However, it is not necessary for the length of the training symbol in the preamble to be (N+G) since it is possible to estimate the characteristics of the channel even if the training symbol length is shortened to $N_I$+G such that ($N_1$+G)<(N+G). The variable $N_I$ may be set so as to establish a range of frequencies that may be estimated. For example, if $N_f$=N/4, then a frequency offset of 4 sub-carrier spacings can be estimated using the training symbol. However, the range to be established may depend upon the characteristics of the channel to be estimated.

Transmission of the training sequence of length $N_I$ corresponds to exciting every Ith sub-channel of an OFDM signal having a block size N. This means that no information is transmitted on the remaining (1−1/I)N sub-channels and the estimates of the channel for the sub-channels are derived from the ones that actually include information.

The sub-channels of the transmit sequence that bear no information are said to be zero-padded. Alternatively, the training sequence of length $N_I$ may be generated by first modulating every Ith sub-channel of the OFDM block by a known sequence of symbols and zero padding the rest. An N-point IDFT is taken to obtain N samples in the time domain, and finally only the first $N_I$ samples along with its cyclic prefix are transmitted. At the receiver after synchronization, the samples corresponding to the training sequence of length $N_I$ are repeated I times before being demodulated by the OFDM demodulators. In a number of alternative systems, many more sub-channels are zero padded to reduce the interference between the adjacent bands and to facilitate the system implementation. For example, in the systems based on the IEEE 802.16a/b standard, a total of 56 tones or sub-carriers are zero padded.

The training sequence structure in the frequency domain is represented by its signal transmission matrix, which is configured in such a way so as to have certain properties that aid in synchronization and channel estimation. For example, the signal transmission matrix for a 2×2 system may be of the form:

$$S_k = \begin{bmatrix} S_{1,k} & S_{1,k} \\ -S_{1,k}^* & S_{1,k}^* \end{bmatrix}, \quad (1)$$

where * denotes a complex conjugate operation, and k is a sub-carrier or sub-channel index. The signal transmission matrix S for a 4×4 system may be of the form:

$$S_k = \begin{bmatrix} S_{1,k} & S_{1,k} & S_{1,k} & S_{1,k} \\ -S_{1,k} & S_{1,k} & -S_{1,k} & S_{1,k} \\ -S_{1,k} & S_{1,k} & S_{1,k} & -S_{1,k} \\ -S_{1,k} & -S_{1,k} & S_{1,k} & S_{1,k} \end{bmatrix}, \quad (2)$$

where $S_1$ is the sequence in the frequency domain that has certain properties that satisfy the system requirements. Similarly, the signal transmission matrix S for a 3×3 system may be of the form:

$$S_k = \begin{bmatrix} S_{1,k} & S_{2,k} & \frac{S_{3,k}}{\sqrt{2}} \\ -S_{2,k}^* & S_{1,k}^* & \frac{S_{3,k}}{\sqrt{2}} \\ \frac{S_{3,k}^*}{\sqrt{2}} & \frac{S_{3,k}^*}{\sqrt{2}} & \frac{-S_{1,k} - S_{1,k}^* + S_{2,k} - S_{2,k}^*}{2} \\ \frac{S_{3,k}^*}{\sqrt{2}} & -\frac{S_{3,k}^*}{\sqrt{2}} & \frac{S_{2,k} + S_{2,k}^* + S_{1,k} - S_{1,k}^*}{2} \end{bmatrix}, \quad (3)$$

The rows of the signal transmission matrix represent the time dimension, the columns represent the space dimension and the index k represents the frequency dimension or the corresponding sub-carrier. The transmitter 8 may create the matrix $S_k$ such that it is unitary. If the vectors of the training sequences are derived from the points along the unit circle in the complex domain then the signal transmission matrices $S_k$ shown in (1) and (2) are unitary. Besides making each of the transmission matrices $S_k$ unitary, it also facilitates the system implementation and maintains a low PAPR of the sequence structure in the time domain. This is because the signal transmission matrices in the training mode and the data mode are exactly alike, which further simplifies the system implementation. The transmission of a unitary matrix aids in parameter estimation, as is described below.

With reference again to FIG. 1, the L number of receiving antennas 20 receive the Q number of transmitted signals and provide the received signals to respective OFDM demodulators 22, which down-convert the signal back to baseband. The L number of receiving antennas 20 are separated by a distance such that the received signals have minimum correlation and are as independent from each other as possible. The outputs from the L number of OFDM demodulators 22 are input into a decoder 24, which combines the multiple signals and decodes them. In addition, the decoder 24 removes any correctable noise and distortion errors, as will be described below, and outputs signals representative of the original data.

Figure 7:
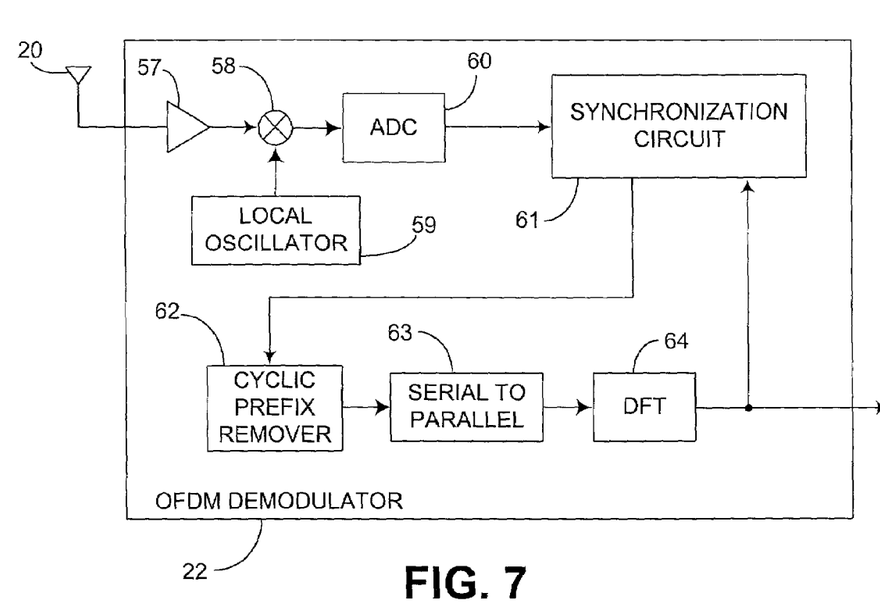
FIG. 7 is a block diagram illustrating an example embodiment of one of the OFDM demodulators shown in FIG. 1.

FIG. 7 illustrates an example embodiment of one of the OFDM demodulators 22 of the receiver 10. Received signals from the receiving antenna 20 are input into a pre-amplifier 57, which amplifies the received signals to a level at which further processing may be performed. The output of the pre-amplifier 57 is connected to a mixer 58. A local oscillator 59 provides a signal to the mixer 58 having a frequency designed to demodulate the received amplified signal. The demodulated signal is then output to an analog-to-digital converter (ADC) 60, which converts the analog signals into discrete time samples. The discrete time samples are applied to a synchronization circuit 61.

An explanation will now be made to emphasize the significance of synchronization in an OFDM system. OFDM typically requires substantial synchronization in time as well as in frequency in order that transmitted signals can be recovered with adequate accuracy. Time synchronization involves determining the best possible time for the start of the received frame to closely match the start of the transmitted signal.

Frequency synchronization involves maintaining orthogonality of the respective sub-carrier frequencies. Orthogonality refers to a condition of the sub-carrier frequencies wherein the "inner product" of the signals at different sub-carrier frequencies is zero. With respect to the inner product, reference is made, for example, to the time domain sequences $s_{1,n}$ wherein n=0, 1, . . . N−1 and the sub-carrier index k is equal to 1. When the sub-carrier index k is equal to 2, the time domain sequences $S_{2,n}$ are transmitted. The inner product is equal to $\Sigma(S_{1,n})^*(S_{2,n})$ wherein n=0, 1, . . . N−1. When the inner product is not equal to zero, a loss of sub-channel orthogonality may result, thereby causing Inter Carrier Interference (ICI). Since the sub-channels 20 are separated by a precise frequency difference to maintain orthogonality, any difference in frequencies between the transmitter and the receiver local oscillators may cause a loss of sub-channel orthogonality. The synchronization circuit 61 corrects this loss of sub-channel orthogonality by finding an estimate of the difference between the frequencies of the local oscillators 46 of the transmitter 8 and the frequencies of the local oscillators 59 of the receiver 10. The synchronization circuit 61 further corrects these frequency difference estimates.

The frequency and time synchronized information is provided to the cyclic prefix remover 62, which removes the cyclic prefixes inserted between each block of N symbols. The blocks of N samples are then serial-to-parallel converted using serial-to-parallel converter 63 and the parallel signals are input to a Discrete Fourier Transform (DFT) stage 64, which converts the time domain samples back to the frequency domain, thus completing synchronization and demodulation by the OFDM demodulators 22.

Referring again to FIG. 1, the L number of demodulated signals from each of the L number of OFDM demodulators 22 are then input into the decoder 24, which processes the demodulated signals. The decoder 24 may be configured in the manner shown in the example embodiment of FIG. 8. The decoder 24 comprises a space-time processor 110 and a parameter estimator 112. Both the space-time processor 110 and parameter estimator 112 receive the signals from each of the L number of OFDM demodulators 22.

Figure 8:
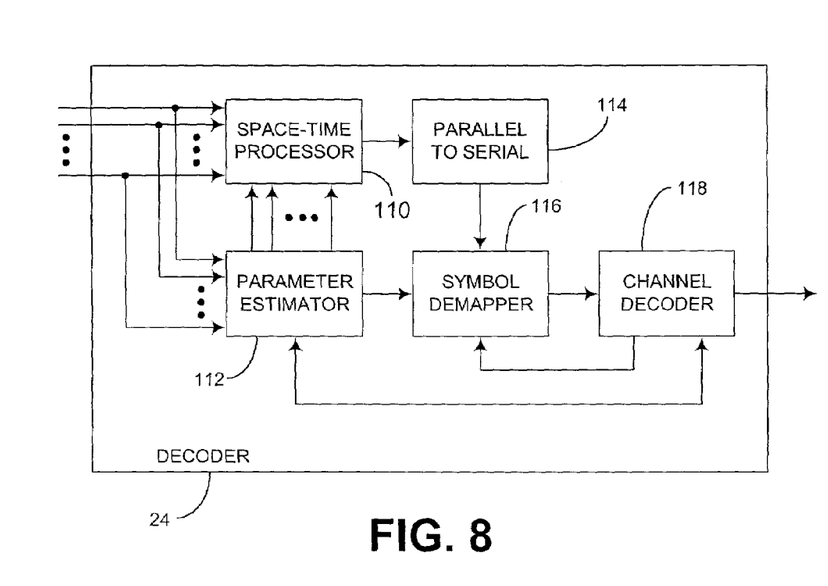
FIG. 8 is a block diagram illustrating an example embodiment of the decoder shown in FIG. 1.

An output from the parameter estimator 112 is input into a symbol demapper 116 and a set of outputs is input into the space-time processor 110. The output of the space-time processor 110 is converted from parallel to serial by a parallel-to-serial converter 114 and then input to the symbol demapper 116, which maps the symbols from the predetermined alphabet back to the data bits. The output from the symbol demapper 116 is input into a channel decoder 118.

The channel decoder 118 decodes the data symbols by checking the parity that was added to the symbols prior to transmission. Thus, the channel decoder 118 detects and corrects errors in the data symbols and outputs the data in its original form. There can be an exchange of information between the parameter estimator 112, symbol demapper 116, and channel decoder 118 to create a feedback loop. If the channel decoder 118 detects too many errors in the training symbol such that correction of the errors is no longer possible, then an "excessive-error" indication is made to the parameter estimator 112, which adjusts and corrects its estimates.

An explanation of the parameter estimator 112 will now be made. The parameter estimator 112 estimates characteristics of the channel across which the communication signals are transmitted. These channel characteristics or parameters may include, for example, the channel coefficient matrix $\eta$, signal to noise ratio (SNR), noise variance, time correlation, and frequency correlation. Having knowledge of the unique channel parameters enables the receiver 10 to compensate for the various distortions introduced by the channel. Since the receiver 10 does not have prior knowledge of the channel parameters, the parameter estimator 112 calculates an estimation of the channel parameters, based on the training sequence transmitted by the transmitter 8. However, because of the complex processing involved with the synchronization circuit 61 to provide time and frequency synchronization and frequency offset estimation, there is a need to design algorithms of the parameter estimator 112 having relatively low complexity to adhere to stringent timing constraints. On the other hand, there is a need for the algorithms to be highly effective for accurately estimating the channel parameters.

Before performing parameter estimation, the received OFDM samples belonging to the training symbols of length $N_I$, and a copy of the transmitted training sequences of length $N_I$ are repeated I times and their N-point FFT are taken to convert the received OFDM sample matrix R and the OFDM signal transmission matrix S to have their dimension in the frequency domain to be N.

Figure 9:
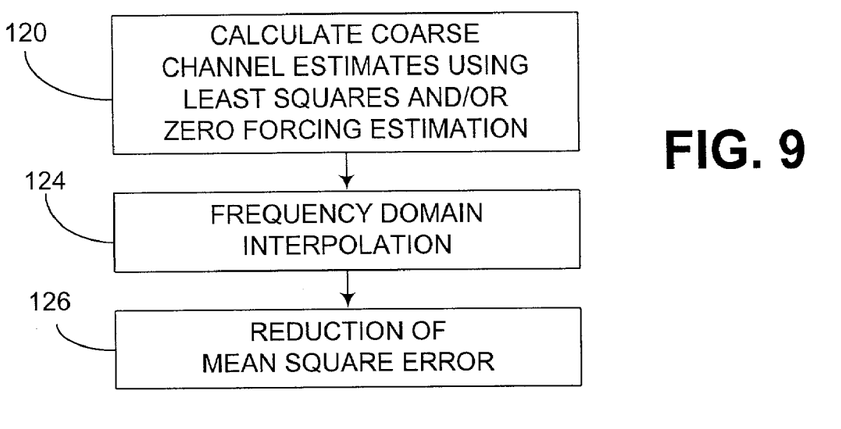
FIG. 9 is a flow chart of a first embodiment of a method for calculating fine channel estimates.

FIG. 9 shows a first embodiment of a method performed by the parameter estimator 112 for calculating channel estimates. The parameter estimator 112 derives its estimates using a Least Squares (LS) method. If a certain number T of training symbols are transmitted from all the Q transmit antennas, where $T \geq Q$, then the LS estimates are obtained as:

$$\overline{\eta}_k = (S_k^H S_k)^{-1} S_k^H \cdot R_k \ k=0,1, \ldots, N_I-1$$

where the signal transmission matrix S for each of the sub-carriers has T rows and Q columns. The channel estimates so obtained minimize the error between the estimated channel coefficient matrix and the actual channel coefficient matrix for each tone. It should be noted that the $N_I$ channel coefficient matrices so obtained are only representative of those tones that were excited in the transmitted sequence. The channel coefficient matrix for all the other tones are set to zero.

Further, if LS method is used along with the use of the signal transmission matrices such as the ones shown in (1) and (2), only Q OFDM symbols of a generalized length $N_I$ are needed to estimate the channel coefficients accurately. In absence of any noise, the parameter estimator 112 provides the exact estimates of the channel coefficient matrices. This type of parameter estimator is called a zero-forcing estimator. Also, by using the LS method, the hardware complexity is reduced considerably since the same circuitry can be used for the data symbols as well as the training symbols.

Hence, if the transmitter 8 creates the transmitting matrices S such that the matrices are unitary as described above, then the preamble may be formed having only Q symbols. By using only Q symbols of any generalized length $N_I$, useful bandwidth is preserved for the transmission of data. Furthermore, the training symbols may be created having fewer than Q symbols, and may even be created having one symbol.

The method of FIG. 9 comprises a first step (block 120) for calculating coarse channel estimates of the channel coefficient matrix using an LS method and/or a Zero forcing method, if the $S_k$s are unitary. The coarse channel estimates may be calculated by a formula such as:

$$\overline{\eta}_k = S_k^H \cdot R_k = S_k^{-1} \cdot R_k = \eta_k + \overline{W}_k \ k=0,1 \ldots, N_I-1$$

where $W_k = (S_k^{-1})(W_k)$.

An aim of the channel estimation algorithm is to estimate the channel coefficients for all the sub-carriers. However, when $N_I$ is not equal to N, the channel coefficients are available for only $N_I$ sub-carriers since the received OFDM training symbol of length $N_I$ was repeated I times before passing through the DFT stage 64. To estimate the sub-carriers that were not excited, a frequency domain interpolation procedure is performed, as indicated by block 124. When the channel comprises a bandwidth that is substantially coherent, a simple linear interpolation scheme may be used to estimate the unexcited sub-carriers. Of course, when I is high, more sub-carriers are estimated from less information, which results in an increase in the mean square error (MSE) in the channel estimates. In the case of increased MSE, a more complex interpolation scheme may be used. Therefore, there is a tradeoff between the greater training sequence overhead to minimize the estimation errors, allowing a simpler interpolation scheme to be used, and a lesser training sequence overhead to avoid taking up useful bandwidth, requiring a more complex interpolation scheme.

Once frequency interpolation has been carried out, flow proceeds to a step of reducing the mean square error (block 126). Since the MSE of the channel estimates of the LS estimator is typically high, it is usually desirable to reduce the MSE. One way of reducing MSE involves three steps, wherein a first step includes multiplying the coarse channel estimate with the inverse matrix $F^{-1}$, which is the inverse of a unitary Fourier transform matrix F given by:

$$F = \frac{1}{\sqrt{N}} \begin{bmatrix} 1 & 1 & \ldots & 1 \\ 1 & \omega & \ldots & \omega^{N-1} \\ 1 & \omega^2 & \ldots & \omega^{2(N-1)} \\ \vdots & & & \vdots \\ 1 & \omega^{N-1} & \ldots & \omega^{(N-1)^2} \end{bmatrix}$$

where $\omega = e^{2\pi j/N}$. This multiplication operation may be expressed as:

$$\underline{g}_{ij} = IFFT_N\{\overline{\eta}_{ij}\} = F^{-1}\{\underline{\eta}_{ij} + \overline{W}_{ij}\}$$

$$= \begin{cases} \sqrt{N} H_{ij,m}(0) + \overline{w}_{ij,m} & 0 \leq m \leq G-1 \\ \overline{w}_{ij,m} & G \leq m \leq N-1. \end{cases}$$

where 1 is less than or equal to i which is less than or equal to Q and 1 is less than or equal to j which is less than or equal to L. The Q*L number of length-N vectors are then made to go through a windowing operation, which reduces the effect of noise variations in the channel and ICI. The windowing operation recovers the time domain fine channel estimates whereby:

$$\hat{h}_{ij,m} = \begin{cases} g_{ij,m} & 0 \le m \le (G-1) \\ 0 & m \ge G \end{cases}$$

The time domain fine channel estimates are then converted to frequency domain fine channel estimates by performing a Fast Fourier Transform (FFT) on the time domain fine channel estimates wherein:

$$\hat{\eta}_{ij} = FFT_N\{\hat{h}_{ij}\} \ 1 \le i \le Q, 1 \le j \le L$$

$$= \eta_{ij} + \hat{W}_{ij}$$

The reduction of the MSE by the previous steps provides accurate estimates of the channel parameters. The parameter estimator 112 outputs these fine channel estimates to the space-time processor 110 in order to compensate for the unique channel parameters. Other than the method mentioned above to reduce the MSE in LS channel estimates, one can follow a number of different methods for reducing MSE, such as performing a smoothing procedure in the frequency domain, a Linear Prediction (LP) procedure, a method where decisions are fed back to the parameter estimator, a decision directed update procedure, etc.

Figure 10:
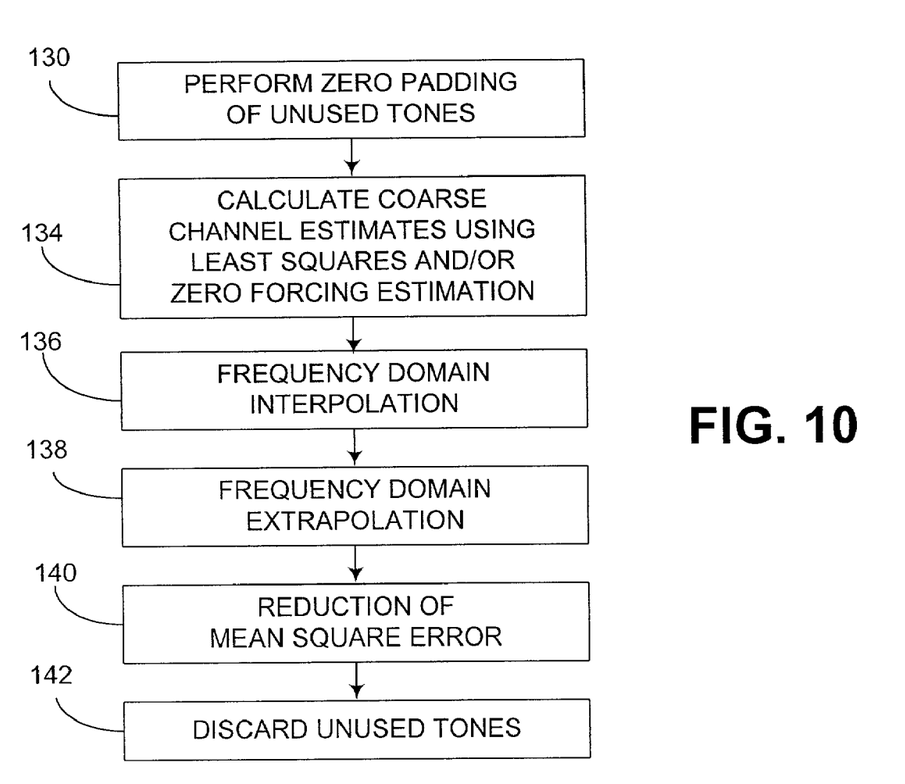
FIG. 10 is a flow chart of a second embodiment of a method for calculating fine channel estimates.

Alternative to the embodiment of FIG. 9, another embodiment for calculating fine channel estimates is illustrated in FIG. 10. This embodiment refers to the case mentioned earlier when a large number of sub-carriers of the OFDM symbols are zero padded to facilitate the system implementation. Again, it is assumed that the signal transmission matrix S may or may not be unitary and the training sequence includes Q training symbols. In this alternative embodiment, a first step (block 130) includes zero padding the recommended sub-carriers in the training sequence. For example, in a system that meets the IEEE 802.16a/b standard, sub-carriers at DC and 55 others at high frequencies are set to zero. This sub-carrier elimination step simplifies the system implementation and further avoids adjacent channel interference. For such systems, the above-mentioned method of MSE reduction typically cannot be applied directly since the channel estimates are not available for the zero-padded sub-carriers. For such systems, the sub-carrier frequencies that are eliminated may be initially estimated using frequency domain extrapolation on the existing LS estimates. The channel estimates at DC can be calculated by taking an average of the channel estimates for the positive and negative frequencies. The estimates of the eliminated sub-carrier frequencies are used to reduce the MSE in the channel estimates but are otherwise ignored since no data is transmitted on these sub-carriers. Once channel estimates for all the sub-carriers are available, the procedure for MSE reduction mentioned above, along with a procedure for noise variance estimation that is described below, can be implemented. In a later step, the fine channel estimates for the zero-padded sub-carriers may be discarded.

After the zero-padding of tones, represented by step 130 in FIG. 10, the coarse channel estimates are calculated using the LS method and/or Zero forcing estimation, as indicated by block 134. This step is identical to the corresponding step 120 of FIG. 9. Block 136 includes the step of performing interpolating in the frequency domain. This step is identical to step 124 of FIG. 9. When frequency domain interpolation has been completed, the method of FIG. 10 proceeds to block 138 where a frequency domain extrapolation takes place. Frequencies at the low and high ends are extrapolated based on the existing middle frequencies in order to arrive at the estimates for these frequencies.

At this point, a reduction in the MSE is calculated, as indicated in block 140. All of the frequencies in the bandwidth, including the eliminated frequencies are used in the reduction of the MSE. Otherwise, step 140 is the same as step 126 of FIG. 9. Since only the MSE-reduced estimates of a selected range of transmitted sub-carrier frequencies are used, the unused frequencies outside the transmission bandwidth are discarded, as indicated in block 142. Thus, the fine estimates of the channel parameters having been obtained at the end of block 142, the parameter estimator 112 outputs the fine channel estimates to the space-time processor 110.

In addition to the estimation of channel parameters, the parameter estimator 112 may further calculate estimates of the "noise variance," which is a parameter representing the power of the extraneous unwanted noise present in the signal. The noise variance is based on the coarse channel estimates and can be obtained for each of the receiving antennas 20.

Figure 11:
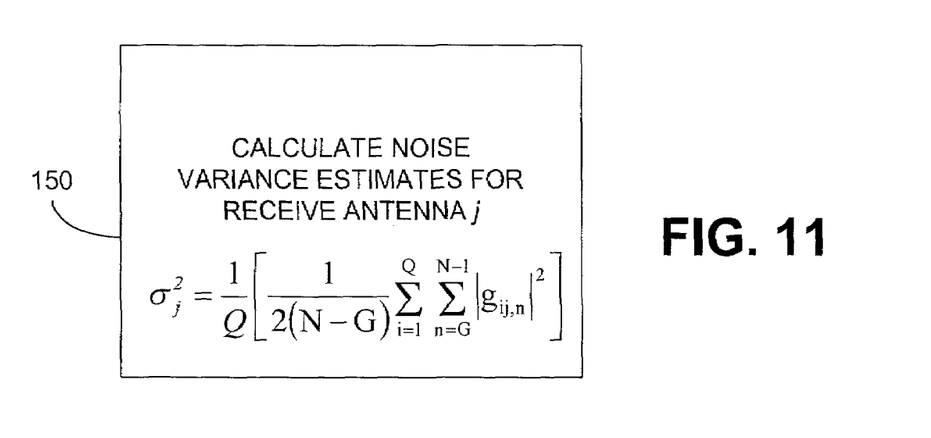
FIG. 11 is a flow chart of an example embodiment of a method for calculating noise variance estimates when the signal transmission matrices are unitary.

FIG. 11 shows an embodiment of a noise variance estimation method. Block 150 indicates a step wherein noise variance estimates for each of the receive antennas can be calculated. Assuming that the signal transmission matrices S are unitary, the noise variance estimates can be obtained directly from the coarse channel estimates using the following formula:

$$\sigma_j^2 = \frac{1}{Q}\left[\frac{1}{2(N-G)}\sum_{i=1}^{Q}\sum_{n=G}^{N-1}|g_{ij,n}|^2\right]$$

where $g_{ij,n}$ is the coefficient of the time domain coarse channel estimates for the $i^{th}$ transmit and $j^{th}$ receive antennas obtained from the parameter estimator 112. The noise variance is calculated for each of the j receive antennas.

Figure 12:
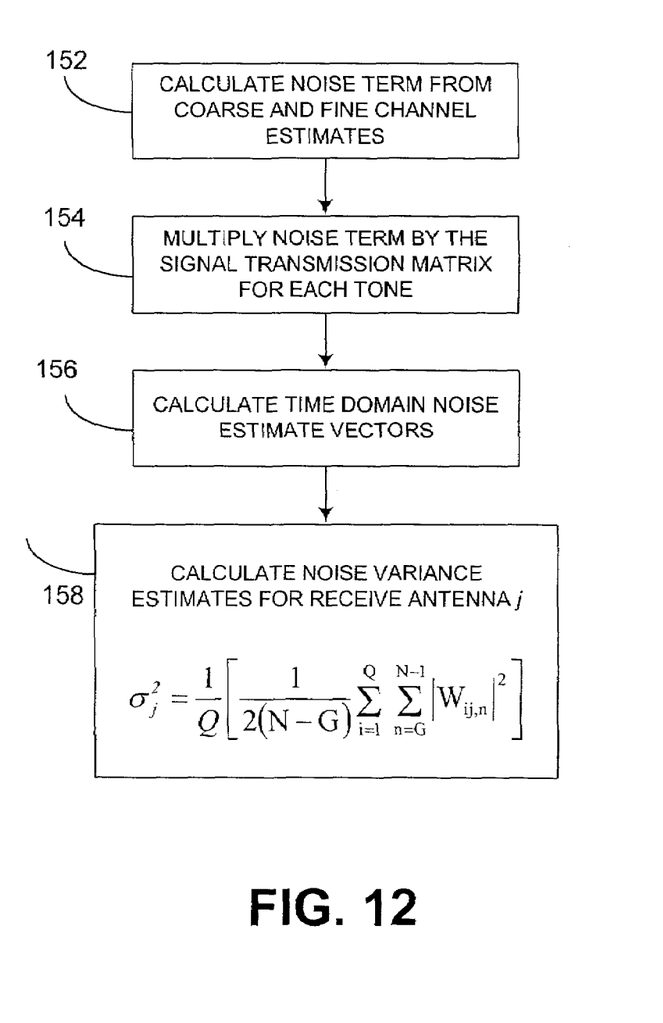
FIG. 12 is a flow chart of an example embodiment of a method for calculating noise variance estimates when the signal transmission matrices are not unitary.

In case the signal transmission matrix is not unitary, then the noise variance estimation is a little more complex. This alternative noise variance estimation method is shown in FIG. 12. A noise term is determined by subtracting the matrices of the fine channel estimates from the matrices of the coarse channel estimates, whereby the coarse channel estimates and fine channel estimates are obtained from the parameter estimator 112 as described above with reference to the channel estimation methods of FIGS. 9 and 10. Calculation of the noise terms is shown using block 152 and can be represented using the following equation:

$$G'_k = \bar{\eta}_k - \hat{\eta}_k, \ k=0,1,\ldots,N-1.$$

The next step includes multiplying the matrices $G_k'$ with the signal transmission matrices $S_k$ as is represented by block 154 and as is given by the following equation:

$$G_k = S_k G'_k, \ k=0,1,\ldots,N-1.$$

The next step is to convert the frequency domain coefficients to the time domain, which is represented using block 156 and can be described using the following equation.

$$\underline{w}_{ij} = IDFT\{\underline{G}_{ij}\} \quad 1 \leq i \leq Q, \ 1 \leq j \leq L \tag{5}$$

Finally, the estimates of the noise variance at each of the receive antennas can be calculated using block 158 and is described using the following equation:

$$\sigma_j^2 = \frac{1}{Q}\left[\frac{1}{2(N-G)}\sum_{i=1}^{Q}\sum_{n=G}^{N-1}|w_{ij,n}|^2\right]$$

The parameter estimator 112 may include software stored in memory, wherein the software may include one or more separate programs, each of which comprises an ordered listing of executable instructions for implementing logical functions. In the example of FIGS. 9-12, the software may include the parameter estimator system in accordance with the present invention and a suitable operating system (O/S). Examples of suitable commercially available operating systems are as follows: a Windows operating system available from Microsoft Corporation; a Netware operating system available from Novell, Inc.; a Macintosh operating system available from Apple Computer, Inc.; a UNIX operating system available from the Hewlett-Packard Company, Sun Microsystems, Inc., or AT&T Corporation; a LINUX freeware operating system that is readily available on the Internet; a run time Vxworks operating system available from WindRiver Systems, Inc.; an appliance-based operating system, such as that implemented in a handheld computer or personal data assistant (PDA) (e.g., PalmOS available from Palm Computing, Inc. or Windows CE available from Microsoft Corporation). The O/S essentially controls the execution of other computer programs, such as the parameter estimation system, and provides scheduling, input-output control, file and data management, memory management, and communication control and related services.

The parameter estimator 112 can be implemented in hardware, software, firmware, or a combination thereof. In the embodiments of the present invention, the parameter estimator 112 can be implemented in software or firmware that is stored in a memory and that is executed by a suitable instruction execution system. If implemented in hardware, as in an alternative embodiment, the synchronization system can be implemented with any or a combination of the following technologies, which are all well known in the art: a discrete logic circuit having logic gates for implementing logic functions upon data signals, an application specific integrated circuit (ASIC) having appropriate combinational logic gates, a programmable gate array (PGA), a field programmable gate array (FPGA), digital signal processor (DSP), etc.

It should be emphasized that the above-described embodiments of the present invention are merely possible examples of implementations, merely set forth for a clear understanding of the principles of the invention. Many variations and modifications may be made to the above-described embodiments of the invention without departing substantially from the principles of the invention. All such modifications and variations are intended to be included herein within the scope of this disclosure and protected by the following claims.

We claim:

1. A transmitter in an Orthogonal Frequency Division Multiplexing (OFDM) system, the transmitter comprising:
    an encoder configured to process data to be transmitted within the OFDM system, the encoder further configured to separate the data onto one or more transmit diversity branches (TDBs);
    one or more OFDM modulators, each OFDM modulator connected to a respective TDB, each OFDM modulator configured to produce a frame including a plurality of data symbols, a training structure, and cyclic prefixes inserted among the data symbols; and
    one or more transmitting antennas in communication with the one or more OFDM modulators, respectively, each transmitting antenna configured to transmit the respective frame over a channel;
    wherein the training structure of each frame includes a predetermined signal transmission matrix at a respective sub-channel, each training structure adjusted to have a substantially constant amplitude in a time domain, and the cyclic prefixes are further inserted within the training symbol, and wherein the cyclic prefixes within the training symbol are longer than the cyclic prefixes among the data symbols, thereby countering an extended channel impulse response and improving synchronization performance.

2. The transmitter of claim 1, wherein the transmitter is incorporated within a Multi-input, Multi-Output (MIMO) system.

3. The transmitter of claim 2, wherein the training structure includes information allowing a receiver device to perform synchronization and parameter estimation for calibrating the MIMO system.

4. The transmitter of claim 1, wherein the cyclic prefixes protect the data symbols against Inter Symbol Interference (ISI).

5. The transmitter of claim 1, wherein the encoder comprises:
    a channel encoder;
    a symbol mapper in communication with an output of the channel encoder;
    a space-time processor in communication with output of the symbol mapper, the space-time processor configured to separate the data into the one or more TDB's; and
    a pilot/training symbol inserter, the pilot/training symbol inserter configured to insert pilot symbols and training symbols onto the TBD's.

6. The transmitter of claim 1, wherein each of the OFDM modulators comprises:
    a serial-to parallel converter;
    an inverse discrete Fourier transform (IDFT) stage in communication with an output of the serial-to-parallel converter;
    a cyclic prefix inserter in communication with an output of the IDFT state;
    a parallel-to-serial converter in communication with an output of the cyclic prefix inserter;
    a digital-to-analog converter (DAC) in communication with an output of the parallel-to-serial converter;
    a local oscillator;
    a mixer having a first input and a second input, the first input in communication with an output of the DC, the second input in communication with an output of the local oscillator; and
    an amplifier in communication with an output of the mixer.

7. The transmitter of claim 1, wherein the training structure includes a signal transmission matrix resembling an existing space-time block code.

8. The transmitter of claim 1, wherein the training structure includes a signal transmission matrix having an existing pseudo inverse matrix.

9. The transmitter of claim 1, wherein a length of the training structure is adjustable.

10. The transmitter of claim 1, wherein a length of the training structure is equal to a single OFDM symbol using alternate tones transmitted from different antennas at substantially the same time.

11. A method comprising:
receiving one or more frames across a channel from one or more transmitting antennas, each frame including a plurality of data symbols, training symbols, and cyclic prefixes inserted among the data and training symbols;
synchronizing the one or more received frames in a time domain;
synchronizing the one or more received frames on a frequency domain; and
estimating parameters of the channel by a process involving one of calculating a channel coefficient matrix, calculating a signal to noise ratio, calculating a noise variance, calculating a time correlation, and calculating a frequency correlation, wherein estimating the parameters of the channel further comprises calculating fine channel estimates, and calculating the fine channel estimates comprises:
zero-padding in the frequency domain to eliminate certain frequency components from the OFDM signal;
calculating coarse channel estimates using a least squares method;
employing a zero-forcing method to calculate the coarse channel estimates;
interpolating the channel estimates in the frequency domain;
extrapolating frequency domain values;
reducing the mean squared error of the coarse channel estimates; and
discarding the unused tones.

12. The method of claim 11, wherein the one or more frames are transmitted in a Multi-Input, Multi-Output (MIMO) orthogonal Frequency Division Multiplexing (OFDM) system.

13. The method of claim 12, further comprising:
maintaining orthogonality by making a space-time matrix of the training symbols at each sub-carrier frequency orthogonal or unitary.

14. The method of claim 11, wherein reducing the mean squared error comprises at least one of a linear prediction procedure, a procedure for averaging the coarse channel estimates in the frequency domain, a procedure for averaging the coarse channel estimates in the time domain, a procedure for utilizing feedback equalizer, a decision directed procedure, a procedure utilizing a feedback from the channel decoder, a procedure for filtering the coarse channel estimates in the frequency domain, and a procedure for processing the coarse channel estimates in the time or frequency domain.

15. The method of claim 11, wherein estimating the parameters of the channel comprises calculating a noise variance.

16. The method of claim 15, wherein calculating the noise variance comprises calculating noise variance estimates using a unitary signal transmission matrix.

17. The method of claim 16, wherein calculating the noise variance estimates comprises calculating the noise variance estimates directly from time domain coefficients of coarse channel estimates.

18. The method of claim 15, wherein calculating the noise variance comprises calculating noise variance estimates using a non-unitary signal transmission matrix.

19. The method of claim 18, wherein calculating the noise variance estimates comprises:
calculating a noise term from coarse channel estimates and fine channel estimates;
multiplying the noise term by signal transmission matrix;
calculating time domain noise estimate vectors; and
determining a noise variance estimation from the time domain noise estimate vectors.

20. The method of claim 11, further comprising:
solving a system of linear equations; and
calculating a coarse channel estimation from the system of linear equations.

21. The method of claim 11, wherein the number of training symbols is equal to the number of transmitting antennas.

22. The method of claim 11, wherein the number of training symbols is greater than the number of transmitting antennas.

* * * * *